United States Patent [19]

Robinson et al.

[11] 3,875,286

[45] Apr. 1, 1975

[54] BENEFICIATION OF ILMENITE ORES

[75] Inventors: Michael Robinson; Frank Clamp; David Aberdeen; David Barry Mobbs, all of Grimsby; Richard Vyvian Pearse, Cleethorpes, all of England

[73] Assignee: Laporte Industries Limited, London, England

[22] Filed: Apr. 4, 1972

[21] Appl. No.: 241,056

[30] Foreign Application Priority Data
Feb. 14, 1972 United Kingdom .............. 6835/72

[52] U.S. Cl. .......................... 423/86, 75/1, 423/82, 423/610
[51] Int. Cl. ...... C22b 1/00, C09g 23/04, C21b 1/00
[58] Field of Search ............. 75/1 T; 423/74, 82, 86, 423/610

[56] References Cited
UNITED STATES PATENTS

| | | | |
|---|---|---|---|
| 2,127,247 | 8/1938 | Dawson | 75/1 |
| 3,446,590 | 5/1969 | Michael et al. | 75/1 |
| 3,502,460 | 3/1970 | Martin et al. | 75/1 |
| 3,597,189 | 8/1971 | Sinka et al. | 75/1 |
| 3,649,243 | 3/1972 | Williams et al. | 75/1 |
| 3,660,029 | 5/1972 | Naguib | 75/1 |

FOREIGN PATENTS OR APPLICATIONS

| | | | |
|---|---|---|---|
| 215,866 | 7/1958 | Australia | 75/1 |
| 547,898 | 9/1942 | United Kingdom | 75/1 |

Primary Examiner—Winston A. Douglas
Assistant Examiner—Mark Bell
Attorney, Agent, or Firm—Kane, Dalsimer, Kane, Sullivan and Kurucz

[57] ABSTRACT

An ilmenite ore may be beneficiated by converting the ore into a pseudobrookite-containing material, reducing that material to give a product having at least 4% of its iron content in the ferric state, and finally leaching the reduced product. Leaching is facilitated by the previous two steps. Pseudobrookite formation may be effected under inert conditions, and may be promoted by certain additives. Results obtained in leaching step are dependent on temperature profile in reduction stage. Leaching may be effected using an acidic solution of ferrous iron.

16 Claims, No Drawings

BENEFICIATION OF ILMENITE ORES

This invention relates to a process for the beneficiation of ilmenite ores, and is especially concerned with the production of a suitable feed material for the manufacture of titanium tetrachloride by chlorination under fluidised-bed reaction conditions.

In the production of titanium tetrachloride by fluidised-bed chlorination, the overall efficiency of the process is impaired when some of the particles present in the chlorinator are so small that they are entrained in the fluidising gas and are carried out of the reactor either unreacted or incompletely reacted. This can either arise from the presence in the starting material of particles which are too small, or from breakdown of the starting material under the fluidised-bed reaction conditions to yield fines. Inadequate particle size in the starting material can result from grinding the ore material before it is beneficiated, and is also observed when, following undesirable dissolution of titanium in a leaching operation, it proves necessary to effect some re-precipitation.

A number of previously proposed processes for beneficiating titaniferous ore materials involve oxidising the ore to convert its iron content entirely to the ferric state, reducing the oxidised material so as to convert its iron content, either wholly or in part, to metallic iron, and finally leaching the reduced product. In a recent proposal, it has been suggested that the reduction should not be carried beyond the stage in which metallic iron constitutes 20% by weight of the reduced product.

The present invention is based in part on the observation that the tendency for breakdown of the beneficiated product in a fluidised-bed to yield fines is associated with the presence of metallic iron in the reduced material prior to the leaching stage. It has been found that the product obtained by leaching material that contains metallic iron contains cavities having diameters of about 10 microns or more, and it is believed that the presence of these cavities is responsible for the undesirable breakdown characteristics of such beneficiates under fluidised-bed reaction conditions.

The present invention provides a process for beneficiating an ilmenite ore, which comprises forming from the ilmenite a material of which at least 20% by weight has a crystal structure of the pseudobrookite type, reducing the said material under such conditions that not less than 4% of the iron content of the reduced material (calculated as Fe) is in the ferric state, and leaching the reduced material so obtained to yield a beneficiated titaniferous material.

It has been found that, by ensuring that at least 4% of the iron content of the material remains in the ferric state, no detectable metallic iron is formed under typical reduction conditions.

As a result of the formation of material having a structure of the pseudobrookite crystallographic type (hereinafter termed merely "pseudobrookite" for convenience), the reduced material formed subsequently is very readily leachable, making it possible to obtain a beneficiated product having a high titanium dioxide content, with very little loss of titanium values in the leaching step. Typically, the process of the invention leads to a product having a titanium dioxide content of 92–93%, with 95–98% efficiency of recovery of titanium values from the reduced material. In the case of certain ilmenites, for example, Western Australian ilmenites, even better results have been obtained.

The formation of pseudobrookite may be effected by subjecting the ilmenite ore to oxidising conditions. Thus, pseudobrookite formation may be brought about by contacting the ilmenite with oxygen, or preferably, an oxygen-containing gas, at an elevated temperature. Conveniently, the pseudobrookite is formed by heating the ilmenite ore in air.

Under oxidising conditions, pseudobrookite can be formed from all types of ilmenite ores. Such oxidation processes form no part of the present invention. It has been found, however, that in the case of weathered ilmenites the desired extent of pseudobrookite formation can be brought about under substantially inert conditions, and one form of the present invention consists of such a process. Conditions are "substantially inert" for this purpose if they are such that not more than 1/15 by weight of the iron content of the ore is reduced. Preferably, non-reducing conditions are employed. The following expression is to be used in calculating the fraction of the total iron content that has been reduced:

$(X_2 - X_1) \times {}^{56}/_{72} \times 1/Z_1$ where
  $X_1$ is the percentage by weight of ferrous iron (calculated as FeO) in the starting material;
  $X_2$ is the percentage by weight of ferrous iron (calculated as FeO) in the reduced material; and
  $Z_1$ is the total iron content of the starting material (expressed as a percentage by weight and calculated as Fe).

The expression "weathered ilmenite" is intended to include beach sand ilmenites, alluvial ilmenites, and leucoxenes. The use of inert conditions lead to better results with relatively highly weathered ores such as, for example, Quilon ilmenites, than with less weathered ores such as, for example, Western Australian ilmenites.

Pseudobrookite cannot be formed from non-weathered massive ilmenites, for example, Norwegian and MacIntyre ilmenites, merely be heating under inert conditions.

The rate of formation of pseudobrookite is very strongly temperature-dependent. At 875°C., for example, the desired quantity of pseudobrookite is not formed, at least with the majority of ilmenites, in an acceptable reaction time. At 900°C., on the other hand, the rate of formation of pseudobrookite is very much more rapid, and the desired quantity can be formed in an acceptable reaction time. Advantageously, therefore, the formation of pseudobrookite is carried out at a temperature of at least 900°C., and preferably at least 925°C. At 950°C., which has been found to be an especially suitable oxidation temperature, oxidation for a period of 40 minutes results in a final beneficiated product having very desirable properties. At 1,000°C., oxidation for 30 minutes is sufficient to yield a product consisting substantially wholly of pseudobrookite and rutile. At lower temperatures, and relatively short times the oxidised material will usually be found to contain some haematite in addition to the pseudobrookite and rutile.

The foregoing oxidation conditions form no part of the present invention, but have been described to illustrate how pseudobrookite may be formed from ilmenite for the purposes of the present invention.

The maximum temperature at which the formation of pseudobrookite may be effected is largely determined by the need to avoid excessive sintering of the ore material. From this point of view, it is preferable that the temperature of the ore material should not exceed 1,000°C.

In certain circumstances, it may be found that the rate of formation of pseudobrookite as a function of temperature is affected to a small extent by the presence of artificially added materials in admixture with the ilmenite ore, or by the presence in the ore of atypically large quantities of impurities. In accordance with the present invention, the formation of pseudobrookite may be effected in the presence of a compound of lithium, sodium, magnesium, zirconium or zinc, preferably in the presence of a lithium compound, for example, lithium chloride. Such compounds serve to promote the formation of pseudobrookite and enable that process to be carried out at relatively low temperatures. If desired, the promoters may instead be used to reduce the time required for the formation of pseudobrookite at a given temperature, or for a combination of these purposes. It will be understood that the use of pseudobrookite promoters in accordance with the invention is not restricted to pseudobrookite formation under inert conditions but applies also to oxidative processes.

Whilst it is only necessary to form 20% by weight of pseudobrookite in order to bring about an improvement in the leachability of the reduced material obtained subsequently, the proportion of pseudobrookite formed is advantageously at least 30% (and preferably at least 50%), estimated by X-ray analysis. It will generally be found to be desirable to carry out the first stage of the process under such conditions that the theoretical maximum proportion of pseudobrookite is approached. Typically, when the pseudobrookite is formed by oxidation, the theoretical maximum proportion will be in the range of from about 60% to about 70% by weight, although it may be as high as 75% in some cases. The proportions quoted in this paragraph form no part of the present invention, but are mentioned to indicate the desirable extent of pseudobrookite formation for the purposes of the present invention.

The pseudobrookite formed from ilmenite will have a composition in the range $TiFe_2O_5$-$Ti_2FeO_5$, depending on the composition of the original ilmenite and on the extent of oxidation occurring in the first stage of the process. If oxidation of the iron content of the original ilmenite is substantially complete, the pseudobrookite will have the composition $TiFe_2O_5$. The crystal structure of that material is well-known and is described, for example, by Pauling in Z. Kristal, volume 73 (1930), pages 97 to 112. Other materials in the composition range given above have closely similar crystal structures (see Akimoto et al., Nature volume 179 (1957), pages 37 and 38).

The pseudobrookite content of a given sample may be measured by comparing the X-ray diffraction pattern of the sample with patterns obtained using standard samples containing known proportions of the same kind of pseudobrookite. Akimoto et al. describe a method of preparing different pseudobrookites within the composition range $TiFe_2O_5$-$Ti_2FO_5$ by heating a mixture of ferric oxide, titanium dioxide, and metallic iron to 1,150°C. and thereater quenching the hot mixture. The total iron and titanium contents of the standard pseudobrookite-containing sample should be in the same ratio by weight as in the original ilmenite. This can be achieved by mixing the synthetic pseudobrookite with appropriate amounts of $TiO_2$ and/or $Fe_2O_3$. It should be noted that, using the foregoing method, it will in general be found that there will be no appreciable detection unless the pseudobrookite content is about 5% by weight or above.

The formation of pseudobrookite may be carried out in any suitable apparatus, for example, in a rotary kiln, which may be operated either co-current or counter-current.

The reduction reaction may be carried out at a temperature in the range of from 800° to 1,000°C., advantageously from 850° to 950°C. The use of temperatures in excess of 1,000°C. leads to increasing difficulties in preventing excessive reduction. Preferably, the material containing pseudobrookite is raised to the desired reduction temperature rapidly. The rate of attainment of the reduction temperature is dependent principally on the design of the reduction apparatus, but it is preferable to transfer the material containing pseudobrookite into the reduction zone while the material is still hot, so lessening the time taken for the material to reach the desired reduction temperature.

The reduction step should be carried out in an oxygen-deficient atmosphere, say, about 1% of oxygen by volume, and the reducing agent should be present in excess, taking into account the oxygen derived from the reactants and any other oxygen that may be present in the reaction apparatus.

As is explained hereinbefore it is essential that the reduced material should contain no detectable metallic iron, and this leads in turn to the requirement that at least 4% of the iron content of the reduced material must remain in the ferric state. Although the proportion of trivalent iron in the reduced material can exceed 4%, a relatively lengthy leaching operation is required at high proportions of ferric iron. Also, pseudobrookite itself is not readily leachable, and the presence of pseudobrookite in the reduced material leads to a leached product having inferior titanium dioxide content. Accordingly, the reduction conditions are advantageously such that the reduction product contains substantially no detectable pseudobrookite (which implies that not more than 5% by weight of pseudobrookite is present). The reduction product then consists predominantly of ilmenite and rutile. In principle, it is desirable to eliminate all of the pseudobrookite, but broadly similar results are obtained with pseudobrookite contents of up to about 5% by weight.

The foregoing discussion of temperature, conditions, and extent of reduction is based on appreciations which form no part of the present invention. It has now been appreciated, however, that in general, optimum titanium dioxide content in the leached material is obtained if the reduction reaction is not continued after the pseudobrookite has been eliminated, and one form of the present invention provides such a process. It is believed that the leaching characteristics of the reduced material are related to its porosity and crystallinity. It is also believed that the material possesses the optimum properties in terms of porosity and crystallinity when the pseudobrookite phase has just disappeared. It will frequently be the case, however, that the ferric iron content of the material is so high at that stage that the required leaching time will be inconveniently or impracticably long.

The maximum proportion of the iron content remaining in the ferric state when elimination of pseudobrookite is substantially complete varies according to the type of ore in question, being about 18% in the case of Western Australian ilmenite, about 40% in the case of Norwegian ilmenite, and about 11% in the case of Quilon ilmenite. It will usually be found advantageous, however, to decrease the proportion of ferric iron below these maximum figures. In the case of Western Australian ilmenite, the reduction is advantageously continued until a proportion of from 8 to 12% of the iron content of the material is in the ferric state. More generally, if the reduction stage is carried out under such conditions that not more than 10%, and preferably at least 8%, of the iron content of the reduction product is in the ferric state, good results will be obtained. The aforementioned ferric iron proportions from no part of the present invention but have been included for the sake of completeness.

In a preferred form of the present invention, the temperature of the reduced material is quickly lowered, when the desired extent of reduction has been achieved, advantageously by discharging the hot reduced material into a cooling zone. If the temperature of the reduced material remains high after the reduction is complete, especially if its temperature is then relatively high, its leaching characteristics will suffer. This deterioration is believed to be associated with changes in porosity and crystallinity that take place if the material is maintained at a high temperature with no significant chemical reaction occurring. Similar changes (which involve increasing pore size and development of crystallinity) do in fact take place to some extent if the material is maintained hot for any length of time after elimination of the pseudobrookite, but their effect will generally be compensated by the concomitant removal of ferric iron, provided that reduction still continues while the material is hot.

The association between leachability and porosity has already been mentioned. It has been found that the porosity of the reduced product in the size range 0.04 to 2 microns is a useful guide to its leachability. The percentage porosity of a material is given by the expression:

pore volume/apparent volume × 100%

The pore size distribution in a material may be measured by the well-known technique of mercury porosimetry.

Generally, the reduced product will be readily leachable if it has at least 7% porosity in the size range 0.04 to 2 microns. Desirably, the porosity in that range is at least 8%. In principle, materials having even higher porosities, say of the order of 10% or more, will be more readily leachable. As pointed out hereinbefore, however, difficulties can arise in endeavouring to combine high porosity with low ferric iron content.

If the temperature of the material is not quickly lowered when the reduction is complete, the pore size distribution will in general not satisfy the conditions laid down in the preceding paragraph.

If the material is to be discharged from the reduction apparatus when the pseudobrookite has been eliminated, then it is preferable to attain a relatively high temperature at that point. If, on the other hand, the reduction is to be continued after the elimination of pseudobrookite, it will generally be advisable to operate with a relatively lower maximum temperature, although it is again preferable that elimination of pseudobrookite should take place at or near the maximum temperature employed. If the material is to remain in the apparatus after elimination of pseudobrookite, it must be emphasised that the desirable crystallinity and porosity will be lost if the temperature remains high with no reduction occurring.

The reduction stage of the process may be effected using a gaseous reducing agent, for example, hydrogen or a hydrocarbon gas such as methane. A preferred gaseous reducing agent is carbon monoxide. Typically, when the reducing agent comprises carbon monoxide, the reduction may be effected at about 800°C., as compared with about 900°C. for methane reduction. Temperatures as low as 700°C. may be employed when the reducing agent comprises hydrogen. Reduction with a gaseous agent may be effected under fluidised-bed reaction conditions.

The reduction may instead be effected by contacting the pseudobrookite-containing material with a solid carbonaceous reducing agent at an elevated temperature. Although the use of a gaseous reductant has the advantage that no solid/solid separation is needed after the reduction, the reaction will commonly proceed more rapidly when a gaseous agent for example, methane) is used, and especially careful control is then required in order to ensure that at least 4% by weight of the iron content of the reduced material is in the ferric state.

It will be appreciated that the reducing agent may be used in admixture with other substances which may assist in the reduction process. For example, hydrogen may be used in admixture with steam.

Any solid carbonaceous reducing agent may be used, but there should be present, preferably contained in the solid material, a quantity of material that is volatile under the conditions of the reaction. The presence of volatiles is essential if the reaction is to proceed at an adequate rate. If used alone, pure carbon containing no volatile matter, for example, calcined petroleum coke, is extremely inefficient in bringing about the desired degree of reduction. The exact volatile content of the reducing agent is not critical, however, and substances having widely differing volatile contents produce similar effects in the reduction reaction, although the rate of reaction will not be the same in each case. In general, the higher the volatile content of the reducing agent, the more rapid is the rate of reduction at a given temperature.

Examples of solid carbonaceous reducing agents which may be used include green coke, semi-coke, lignite, and the coal/coke mixture known as reject char, which is a material obtained in the low-temperature carbonisation of coal.

Advantageously, the reducing agent is coal, for example, anthracite. Any coal may be used, provided that it is non-caking under the conditions of the reaction. The tendency of certain coals to form cakes may be overcome by oxidising the coal for a period of from about ¼ hour to about 1½ hours at a temperature in the range of from 200° – 400°C., and such pre-oxidised coal may be used in the process of the present invention.

With regard to the particle size of a solid carbonaceous reducing agent used in the reduction step, the limits are not critical. The most important factor governing the maximum particle size is the desirability of the surface area of the particles being sufficiently high to give reasonable reaction efficiency. If the reaction mixture is to be exposed to a gas stream, the use of very small particles (which might of course be entrained in the stream) should be avoided. Material having a suitable particle size can readily be obtained by grinding.

When an excess of a solid reducing agent is used, the reduced material may be separated by magnetic techniques from the unconsumed reducing agent.

Reduction with a solid reductant may be effected in any suitable apparatus. For example, a rotary kiln may be employed, and may be operated either co-current or counter current.

The selection of reducing agents forms no part of the present invention but the examples given herein have been included for illustrative purposes.

Advantageously, the conditions in the reduction zone of the apparatus are such that the residence time of the material at the reduction temperature does not exceed 2 hours, and preferably does not exceed 1½ hours. Especially good results are obtained if the residence time at the desired temperature is from 1¼ to 1½ hours.

The residence times quoted above form no part of the present invention, but the invention does provide an improved temperature profile for use in a gas-fired kiln with coal as reductant. The improved profile is one lying within the limits set out in the following Table:

| Time (minutes) | 0 | 25 | 35 | 50 | |
|---|---|---|---|---|---|
| Temperature (°C) | 500±70 | 700±50 | 800±50 | 900±70 | |
| Time | 60 | 70 | 85 | 100 | 110 |
| Temperature | 910±50 | 900±50 | 850±40 | 800±30 | 750±20 |

In a process operated in accordance with the above table, the reduction reaction will continue after elimination of pseudobrookite.

In another preferred form of reduction according to the invention, a two-stage temperature profile is utilised: a first stage at a temperature of up to about 850°C. followed by a second stage at 900°–950°C. there being a fairly sharp rise in the temperature profile between the two stages.

There is a risk that a certain amount of re-oxidation will take place as a result of atmospheric air coming into contact with the reduced material while it is cooling, and it will generally be found advisable to take precautions to prevent any significant re-oxidation taking place, as such re-oxidation impairs the leaching characteristics of the material to some extent. For example, when a solid carbonaceous reducing agent is used, the reduction product is preferably cooled out of contact with the atmosphere before being separated from any unconsumed reducing agent. The prevention of re-oxidation is preferable irrespective of the method of reduction employed, and does not in itself form part of the present invention.

The material obtained by the process steps described hereinbefore is readily leachable and a wide variety of leaching techniques may therefore be employed. Typically, a single-stage treatment with a 25% excess (over the stoichiometric quantity required in respect of the iron values only), of 17½–20 w/w hydrochloric acid for 3 to 4 hours at a temperature of from 100° to 108°C. leads to a product having a titanium dioxide content of at least 90% with at least 95% recovery of titanium values, and with substantially no degradation of particle size. Although other mineral acids may be used, hydrochloric acid is the preferred leaching agent, and may be recovered from the residual leach liquor by a thermal decomposition process, for example, by the process disclosed in British Pat. No. 793,700.

It will generally be found that the reduced material is sufficiently reactive in leaching that a single-stage leaching treatment at normal atmospheric pressure is all that is required. Accordingly, it will usually be unnecessary to resort to more severe leaching conditions and systems, for example, multi-stage leaching, continuous co-current, counter-current or cross-current leaching systems, or the use of superatmospheric pressure. The reduced material will frequently be found to be sufficiently reactive that hydrochloric acid having a strength as low as 15% will be adequate. Preferably, the strength of the hydrochloric acid does not exceed 20% w/w.

It will generally be found that a single-stage acid leaching treatment (involving no replenishment of used acid) will not only remove almost all of the iron values, but will also remove significant quantities of impurity elements such as, for example, manganese, chromium, and vanadium. In any leaching operation in which the acid is not continually replenished, the strength of the leaching acid will decrease steadily as the leaching operation progresses. In this connection, it has been found that the rate of leaching at any given instant is a function not only of the prevailing acid strength at that instant, but also of the initial acid strength.

The leaching techniques described hereinbefore are not in themselves part of the present invention which does provide, however, a process in which the reduced material is leached with an acidic solution that contains some ferrous iron initially, for example a solution of ferrous chloride in hydrochloric acid. In general, such a solution will produce similar results in terms of titanium dioxide yield and content to those obtained by using the same quantity of acid alone, but will produce such results in a shorter time.

A solution containing ferrous iron may be obtained in a variety of ways. For example, if a quantity of leached material is washed with hydrochloric acid solution, the wash liquor will contain some ferrous iron in solution, and that wash liquor may then be used as leachant. Instead, the acid leaching solution may contain residual leach liquor. In such a process, the residual leach liquor will eventually contain such a high concentration of ferrous iron as to be unsuitable for recycle. If a hydrochloric acid leaching solution is employed, the acid may be recovered from the residual leach liquor by a thermal decomposition process, for example, by the process described in British Pat. No. 793,700, and such a recovery process will be especially valuable when the residual leach liquor is unsuitable for direct recycle.

When a solid reducing agent is used, it is preferable to separate the reduction product from any unconsumed reducing agent before the leaching treatment is carried out. Advantageously, the desired separation is effected by means of a magnetic separation technique. Such a separation process will also reduce the quantity of any gangue material that may be present, for example, silica sand.

The beneficiated titaniferous material resulting from the leaching step does not break down to yield fine particles under fluidised-bed chlorination conditions, at least to any substantial extent, and the chlorination reaction can therefore produce a high yield. Accordingly, the present invention also provides a process for the production of titanium tetrachloride which comprises forming from an ilmenite ore a material of which at least 20% by weight has a crystal structure of the pseudobrookite type, reducing the said material under such conditions that not less than 4% of the iron content of the reduced material (calculated as Fe) is in the ferric state, leaching the reduced material so obtained to yield a beneficiated titaniferous material, and chlorinating the beneficiated material under fluidised-bed reaction conditions.

The beneficiated material contains a very small proportion of material that is relatively resistant to leaching. Such material does tend to yield fines on breakdown, but has a crushing strength which is sufficiently high that the particles do not in practice break down to any substantial extent under the chlorination conditions.

Desirably, the material to be chlorinated has a mean particle diameter of at least 100 microns, with substantially none of the particles having a diameter of less than 65 microns. It is a feature of beneficiation processes in accordance with the present invention that the mean particle diameter of the beneficiated material is not substantially different from that of the ilmenite ore starting material. Accordingly, the particle size distribution of the ilmenite is advantageously such that the mean weight diameter is at least 100 microns, and that there are substantially no particles having a diameter of less than 65 microns.

After being leached, the material may be calcined to a temperature of from 600° to 700°C. Before being calcined, the leached material will be washed to remove residual leach liquor.

Such calcination of the leached material enhances its reactivity (measured as described hereinafter) in subsequent chlorination under fluidised-bed reaction conditions.

The reactivity of the calcined material under fluidised-bed chlorination conditions is measured for the purposes of the present invention by evaluating the ratio $CO/(CO+CO_2)$ for the exhaust gases from the chlorinator. The value of this ratio provides a measure of the exothermicity of the chlorination reaction, and a low value of the ratio is taken to indicate a highly reactive material. It should be noted that, in practice, the value for the ratio is taken as the mean of a number of readings made during the chlorination process.

Typically, the value of the $CO/(CO+CO_2)$ ratio obtained in chlorinating natural rutile is of the order of 0.20 – 0.24. The value of the ratio for the product of the present invention may be as low as 0.25, or even lower in some cases, indicating that the reactivity of the material is approaching that of natural rutile, and may be of closely similar reactivity in some cases. The carbon monoxide and carbon dioxide contents of the exhaust gases from the chlorinator may be determined by gas-liquid chromatography.

The calcination may be effected in any suitable apparatus, and may be continued for a period of from ¼ to 2 hours, preferably for about ¼ hour.

Chlorination of the product may be effected, for example, in a fluidised-bed chlorinator having a diameter of 15 cm. and constructed of silica. The chlorine flow rate in such a reactor may be about 35 l/min. and the reaction temperature may be maintained at 925° ± 25°C. with a bed having a depth of 1.35 m. By way of example, a leached beneficiate was calcined at 600°C. and then chlorinated under the conditions described in this paragraph. The $CO/(CO+CO_2)$ ratio in the exhaust gases was found to be 0.25. By comparison, when a sample of the same leached beneficiate was chlorinated under the same conditions, but without being calcined at 600° - 700°C. prior to chlorination, the value for the ratio was 0.34. A ratio of 0.34 was also obtained when, in another comparison experiment, the beneficiate was calcined at a temperature in excess of 800°C. before being chlorinated.

In the chlorination of material that has been calcined as hereinbefore described, the chlorine utilisation is generally of the order of 100%. Further, the calcination (which is not in itself part of the present invention) is effective in thoroughly removing water from the leached beneficiate.

The invention also provides a reactive titaniferous material obtained by the process of the invention and suitable for use as a feed material in the production of titanium tetrachloride by fluidised-bed chlorination.

The invention further provides a beneficiated titaniferous material obtained by a beneficiation process according to the invention.

The beneficiated material has a porous structure, substantially all of the pores being below 2 microns in diameter. The structure is generally free from large cavities and it is believed that this contributes to the desirable behaviour of the material under fluidised-bed reaction conditions.

The following Examples illustrate the invention:

EXAMPLE 1

2 Kg. of a sample of Western Australian ilmenite was brought up to 1,000°C. and was roasted in an oxidising atmosphere in a gas-fired furnace at that temperature for a period of one hour. The ilmenite was contained in shallow trays and the contents of the trays were raked at frequent intervals throughout the oxidising treatment. Initially, the ilmenite ore was found by wet analysis to contain 54.6% titanium calculated as $TiO_2$, 17.0% ferric iron calculated as $Fe_2O_3$, and 23.7% ferrous iron calculated as FeO, each percentage being by weight. The particle size distribution of the ilmenite ore was such that 99.8% by weight of the material had a particle size in the range of from 75 to 200 microns, the mean weight diameter being 160 microns. After the oxidising roast, no FeO could be detected on wet analysis and X-ray examination showed the structure of the oxidised material to comprise 65% by weight pseudobrookite with some rutile.

100 G. of the oxidised material was reduced in a two-stage process as follows: 100 g. was mixed intimately with 50 g. powdered anthracite, and the resulting mixture was maintained at 850°C. for 40 minutes in a gas-fired furnace and then at 925°C. for a further 40 minutes. The mixture was contained in a fire-clay crucible and was prevented from coming into contact with the furnace atmosphere.

On completion of the reduction stage, the crucible was allowed to cool with the contents out of contact with air, and the contents were then separated into ore and coal char fractions.

The ore fraction was leached in boiling 18% w/w hydrochloric acid for 4 hours, the quantity of acid being 25% in excess of the stoichiometric requirement calculated with respect to iron values only. The leached material was washed first with 20% w/w hydrochloric acid to yield a wash liquor comprising a solution of ferrous iron in hydrochloric acid, and then with water. The washed material was calcined at 650°C. in shallow trays in a gas-fired furnace, thereby producing a dry material suitable for fluidised-bed chlorination. The titanium dioxide content of the material was 91.7%.

An additional quantity of reduced material was prepared as described above, and was leached using the ferrous iron containing was liquor that had been obtained by washing the previous sample with 20% w/w hydrochloric acid. In this case, however, leaching was continued for 3 hours only, after which time the leached material was washed with water and calcined as before. It was found that the titanium dioxide content of the resulting beneficiate was 91.7%, demonstrating that the leaching efficiency of the solution of ferrous iron in hydrochloric acid was greater than that of hydrochloric acid alone.

EXAMPLE 2

0.7% by weight of lithium chloride solution was added to a quantity of Western Australian ilmenite (the percentage of lithium chloride being calculated as Li and based on the weight of the ilmenite). The ilmenite was then fed to a gas-fired rotary kiln, 0.55m. in diameter and 7.3m. in length, at a rate of 45 kg. per hour, and was oxidised in the kiln at 850°C. by means of atmospheric air. The residence time of the ilmenite in the kiln was about 2 hours, and X-ray examination of the oxidised material showed it to comprise 35% by weight pseudobrookite together with rutile and haematite.

The oxidised material was mixed with 30% by weight of kibbled anthracite and heated in the kiln to 950°C. over a period of one hour. During this period, the oxygen content of the exit gases from the kiln varied between 0.5 and 1% by volume. The material was then discharged from the kiln and cooled out of contact with the atmosphere. After cooling, the reduced material was separated magnetically from the unconsumed anthracite. On wet analysis, the ore material was found to contain 38% by weight ferrous iron calculated as FeO and about 2½% by weight ferric iron calculated as $Fe_2O_3$, with no detectable metallic iron, that is to say, 5.6% of the iron content of the material was in the ferric state.

The reduced material was then leached in boiling 18% w/w hydrochloric acid for 4 hours, the quantity of acid being 25% in excess of the stoichiometric quantity calculated with respect to iron values only, and the resulting beneficiated material was found to contain 92.6% by weight of $TiO_2$. The efficiency of recovery of titanium in the leaching step was 98%.

No large cavities could be detected within the grains of the beneficiated material, which had a porous structure.

By way of comparison, it was found that an oxidation temperature of 900°C. was needed to give comparable results without using lithium chloride as pseudobrookite promoter.

EXAMPLE 3

300 Gm. of Western Australian ilmenite were heated for two hours in a small laboratory fluidised-bed reactor in a stream of commercial nitrogen preheated to 900°C. X-ray examination of the product showed it to contain 30% by weight pseudobrookite.

100 gm. of the pseudobrookite-containing product were reduced and leached as described in Example 2, to give a beneficiate containing 90.5% $TiO_2$ with 94% efficiency of recovery of titanium.

EXAMPLE 4

70 gm. Western Australian ilmenite was oxidised to yield a material containing 60% by weight pseudobrookite. The material was then placed in a boat and heated in a tube furnace to 800°C. Excess carbon monoxide was passed over the boat for 1½ hours after which the product was cooled in a reducing atmosphere. Analysis of the reduced material showed that 9.8% of its iron content was in the ferric state. The reduced material was leached as described in Example 2 to give a beneficiate containing 95% $TiO_2$ with 95% efficiency of recovery of titanium.

In the claims which follow, the term "pseudobrookite" has the meaning assigned hereinbefore, that is to say, "material having a structure of the pseudobrookite crystallographic type."

We claim:

1. A process for beneficiating a weathered ilmenite ore, which comprises forming from the ilmenite under non-oxidizing conditions and without reducing more than 1/15 by weight of the iron content of the ilmenite, a material of which at least 20% by weight comprises pseudobrookite, reducing the said material to yield a material having at least 4% of its iron content (calculated as Fe) in the ferric state, and leaching the reduced material so obtained to yield a beneficiated titaniferous material.

2. A process according to claim 2, wherein the ilmenite is a Quilon ilmenite.

3. A process according to claim 1, wherein the formation of pseudobrookite is effected at a temperature of from 900° to 1,000°C.

4. A process according to claim 1, wherein the formation of pseudobrookite is effected in the presence of a compound selected from the group consisting of compounds of lithium, sodium, magnesium, zirconium, and zinc.

5. A process according to claim 5, wherein the said compound is a lithium compound.

6. A process according to claim 1, wherein the reduced material is quickly cooled when the desired extent of reduction has been achieved.

7. A process according to claim 1, wherein the reduction reaction is discontinued when the pseudobrookite has been eliminated from the reduced material.

8. A process according to claim 1, wherein the reduced material contains substantially no detectable pseudobrookite.

9. A process according to claim 1, wherein the pseudobrookite content of the reduced material does not exceed 5% by weight.

10. A process according to claim 1, wherein the reduction is effected by means of a solid carbonaceous reducing agent in the presence of carbonaceous volatiles, and is performed in two temperature stages: a first stage at a temperature of up to 850°C. followed by a sharp increase to a second stage at a temperature of from 900° to 950°C.

11. A process according to claim 1, wherein the reduction is effected by means of hydrogen and at a temperature of from 700° to 800°C.

12. A process according to claim 1, wherein from 4 to 10% of the iron content of the reduced material is in the ferric state.

13. A process according to claim 14, wherein at least 8% of the iron content of the reduced material is in the ferric state.

14. A process according to claim 1, wherein the pseudobrookite is substantially eliminated during the reduction stage, and the temperature profile in that stage is such that the maximum temperature is reached during the elimination of pseudobrookite.

15. A process according to claim 1, wherein the pore size distribution in the reduced product is such that it has at least 8% porosity in the size range 0.04 to 2 microns.

16. Beneficiated titaniferous material whenever prepared by a process according to claim 1.

* * * * *

UNITED STATES PATENT OFFICE
CERTIFICATE OF CORRECTION

PATENT NO. : 3,875,286
DATED : April 1, 1975
INVENTOR(S) : Michael Robinson et al.

It is certified that error appears in the above-identified patent and that said Letters Patent are hereby corrected as shown below:

At Column 3, line 65 - after the word "range" delete "$TiFe_2O_5-Ti_2FO_5$" and insert in its place -- $TiFe_2O_5-Ti_2-FeO_5$ --

At Column 5, line 20, change "from" to read -- form --

At Column 7, line 24, after the word "from" change "1-1/2" to read -- 1-1/4 --

At Column 11, line 16, after the word "containing" change "was" to read -- wash --

Claim 2, line 1, change the numeral "2" re read -- 1 --

Claim 5, line 1, change the numeral "5" to read -- 4 --

Claim 13, line 1, change the numeral "14" to read -- 12 --

Signed and Sealed this twenty-third Day of September 1975

[SEAL]

Attest:

RUTH C. MASON
Attesting Officer

C. MARSHALL DANN
Commissioner of Patents and Trademarks